(12) United States Patent
Wang et al.

(10) Patent No.: US 11,448,765 B2
(45) Date of Patent: Sep. 20, 2022

(54) ADAPTIVE FILTERING METHOD OF PHOTON COUNTING LIDAR FOR BATHYMETRY

(71) Applicant: China University of Geosciences, Wuhan, Wuhan (CN)

(72) Inventors: Lizhe Wang, Wuhan (CN); Yifu Chen, Wuhan (CN); Yuan Le, Wuhan (CN); Gang Chen, Wuhan (CN); Weitao Chen, Wuhan (CN)

(73) Assignee: China University of Geosciences, Wuhan (CN)

( * ) Notice: Subject to any disclaimer, the term of this patent is extended or adjusted under 35 U.S.C. 154(b) by 0 days.

(21) Appl. No.: 17/134,561

(22) Filed: Dec. 28, 2020

(65) Prior Publication Data

US 2021/0116570 A1    Apr. 22, 2021

(30) Foreign Application Priority Data

Feb. 6, 2020 (CN) .......................... 202010081826.0
Oct. 13, 2020 (CN) .......................... 202011090713.3

(51) Int. Cl.
| | |
|---|---|
| *G01S 17/89* | (2020.01) |
| *G01S 7/481* | (2006.01) |
| *G01S 7/4861* | (2020.01) |
| *G01S 7/487* | (2006.01) |

(52) U.S. Cl.
CPC .............. *G01S 17/89* (2013.01); *G01S 7/487* (2013.01); *G01S 7/4813* (2013.01); *G01S 7/4861* (2013.01)

(58) Field of Classification Search
None
See application file for complete search history.

(56) References Cited

PUBLICATIONS

Chen, High-repetition-rate, sub-nanosecond and narrow-bandwidth fiber-laser-pumped green laser for photon-counting shallow-water bathymetric Lidar, Results in Physics 19 (2020) 103563 (Year: 2020).*

Zhu, A Noise Removal Algorithm Based on Optics for Photon-Counting LiDAR Data, IEEE Geoscience and Remote Sensing Letters (Year: 2020).*

Parrish, Validation of ICESat-2 ATLAS Bathymetry and Analysis of ATLAS's Bathymetric Mapping Performance, Remote Sens. 2019, 11, 1634; doi:10.3390/rs11141634 (Year: 2019).*

\* cited by examiner

*Primary Examiner* — Hovhannes Baghdasaryan

(57) ABSTRACT

An adaptive filtering method of photon counting Lidar for bathymetry is provided in this invention, which includes steps: step S1: adaptively acquiring parameters of elliptic filtering for water surface photon signals; step S2: determining a relationship between filter parameters and elevation of underwater photon signals, and obtaining parameters of the elliptic filtering for photon signal in water column; and step S3: filtering and fitting the water surface photon signals and the underwater photon signals to acquire continuous bathymetry results.

3 Claims, 3 Drawing Sheets

ADAPTIVE FILTERING METHOD OF PHOTON COUNTING LIDAR FOR BATHYMETRY

BACKGROUND OF THE INVENTION

Field of the Invention

The present invention relates to the field of model and method, in particular, to an adaptive filtering method of photon counting Lidar for bathymetry.

Description of Related Art

Photon counting Lidar is a new type of laser detection technology developed in recent years. Compared with traditional Lidar, photon counting Lidar has a higher pulse emission repetition frequency, and uses extremely sensitive receiving devices, which convert traditional devices that accept hundreds or even thousands of photons' echo envelope amplitude detection into single photon detection. Therefore, it has the advantages of long distance, high repetition frequency, high efficiency, and light weight; and it overcomes the problems of large size, large mass, low reliability, and the contradiction between pulse energy and repetition frequency for traditional lasers. The photon counting Lidar has a big difference in design ideas and data processing methods. When acquiring effective signals, it no longer focuses on acquiring waveforms with high signal-to-noise ratio using high-energy emission, but instead focuses on using limited resources and make full use of every photon. By improving the method of data processing, effective signal extraction can also be achieved in low signal-to-noise ratio signals. Laser altimetry technology based on photon counting detection has become a future development trend and direction of laser detection technology.

Previous studies have shown that photon counting Lidar has the ability for bathymetry; however, when the photon counting Lidar detects the water column, the laser point cloud will show different characteristics from the land. At present, there is no research focus on photon data in bathymetry. Therefore, traditional algorithms showed poor effects when processing photon signals in water column, and cannot effectively extract the water surface as well as the water bottom photon signals at the same time and calculate the water depth.

For the problems of photon counting data processing, no effective solutions have been proposed.

SUMMARY OF THE INVENTION

In view of the above technical problems in the related art, the present invention proposes an adaptive filtering method of photon counting Lidar for bathymetry, which can overcome the above shortcomings of the prior art.

In order to achieve the above technical objectives, the technical solution of the present invention is achieved as follows:

An adaptive filtering method of photon counting Lidar for bathymetry includes the following steps:

step S1: adaptively acquiring the parameters of the elliptic filtering for water surface signals, and step S2: determining the relationship between the filter parameters and the elevation of the underwater photon signals; and obtaining the parameters of the elliptic filtering for photon signal in water column;

step S3: filtering and fitting the water surface photon signals and the underwater photon signals to acquire continuous bathymetry results.

Preferably, in the step S1, the step of adaptively acquiring the parameters of the elliptic filtering for water surface signals based on photons density includes:

sub-step S11: acquiring raw point cloud data P of the photon counting Lidar:

$$P=(D_i,H_i), i \in [1,N_p],$$

wherein $D_i$ is the along-track distance of each photon signal, $H_i$ is the elevation of each photon signals, and $N_P$ is the number of photons included in the raw point cloud data;

sub-step S12: with $\Delta h$ as a slice interval of the elevation direction, cutting original data into m slices in the elevation direction:

$$m = \frac{\max(H_i) - \min(H_i)}{\Delta h};$$

sub-step S13: for m slices units sliced in the sub-step S12, counting the number $x_m$ of photon signals in each slice:

$$h_m = \min(H_i) + \frac{2m-1}{2}\Delta h,$$

wherein $h_m$ is the center elevation of each elevation slices, and $x_m$ is the number of photon signals in the slice;

sub-step S14: fitting a relationship between the center elevation of the elevation slice $h_m$ and the number of photon signals in the slices $x_m$ with a normal distribution curve to obtain a fitting relationship f(x):

$$f(x) = x_{maxpho} \exp\left(-\frac{(x - h_{maxpho})^2}{2\sigma^2}\right),$$

wherein $x_{maxpho}$ indicates a number of photon signals in the elevation slice containing the most photon signals, $h_{maxpho}$ indicates the elevation of this slice, $\sigma$ is the standard deviation of the normal distribution, and x indicates a normally-distributed independent variable;

sub-step S15: with $h_{maxpho}$ in the step S4 as a center and twice the normal distribution standard deviation as a left and right threshold, determining an elevation boundary line of the water surface photons while determining the semi-minor axis b of the ellipse for filtering:

$$\begin{cases} H'_{min} = h_{maxpho} - 2\sigma \\ H'_{max} = h_{maxpho} + 2\sigma \end{cases},$$

$$b = 2\sigma,$$

wherein $H'_{min}$ is an elevation lower limit of the water surface photons, and $H'_{max}$ is an elevation upper limit of the water surface photons;

sub-step S16: with the elevation lower limit $H'_{min}$ and the elevation upper limit $H'_{max}$ of the water surface photons as boundaries, acquiring the elevation of each water surface photons to form a water surface photon data set SP and an underwater photon data set WP:

$$\begin{cases} SP = (SD_k, SH_k), k \in [1, N_{sp}] \\ WP = (WD_l, WH_l), l \in [1, N_{wp}] \end{cases},$$

wherein $SD_k$ indicates the along-track distance of a water surface photon in the data set, $SH_k$ indicates the elevation of the photon on water surface, and $N_{sp}$ is the number of photons in the water surface data set that meet the following conditions: $H'_{min} < SH_k < H'_{max}$, $WD_l$ indicates an along-track distance of a underwater photon in the data set, $WH_l$ indicates the elevation of the underwater photon, and $N_{wp}$ is the number of photons in the underwater data set that meet the following conditions: $WH_l < H'_{min}$;

sub-step S17: in the water surface photon data set SP, with a length of the along-track resolution $\Delta d$ of the photon counting Lidar as the boundary, placing the water surface photons into q data sets $WP_u$:

$$q = \frac{\max(SD_k) - \min(SD_k)}{\Delta d},$$

$$WP_u = (SD_u, SH_u), u \in [1, q];$$

sub-step S18: counting a maximum difference of elevation for photons in the q sets in the elevation direction $\Delta SH_u$, and acquiring a mean Ratio_ab, thereby acquiring a semi-major axis length a:

$$\Delta SH_u = \max(SH_u) - \min(SH_u),$$

$$\text{Ratio\_ab} = \frac{\sum_{u=1}^{q} \Delta d / \Delta SH_u}{q},$$

$$a = b * \text{Ratio\_ab},$$

wherein Ratio_ab is the ratio of the major axis to the minor axis of the search ellipse;

sub-step S19: in the water surface photon data set SP, traversing all data points, and then constructing a search region with the point as a center, a as the major axis and b as the minor axis of the ellipse to count the number of the points $p_v$, $v=1, 2, 3 \ldots N_{sp}$ in the search region. The mean value of the number of the points is the initial minimum number of the points minpts;

$$\text{minpts} = \frac{\sum_{v=1}^{N_{sp}} p_v}{N_{sp}};$$

sub-step S110: traversing each point in the water surface photon data set SP, and with the point $(SD_k, SH_k)$ as a center and a, b as the semi-major axis and the semi-minor axis of the elliptical search region respectively, determining whether the remaining points $(SD_x, SH_x)$ in the water surface photon data set SP are located in the search region:

$$\text{diss}_x = \frac{(SD_x - SD_k)^2}{a} + \frac{(SH_x - SH_k)^2}{b},$$

if $\text{diss}_x < 1$, the point $(SD_x, SH_x)$ is in the elliptical search region with $(SD_k, SH_k)$ as a center. Then counting the number of all the signal points in the search region; if this value is larger than minpts, then marking $(SD_k, SH_k)$ as a signal point, otherwise being a noise point.

Preferably, in the step S2, the step of determining a relationship between filter parameters of underwater photon signals and elevation values of photon signals includes:

sub-step S21: determining how the underwater photons change with the water depth; after filtering the water surface photons, basing on the data set $(h_m, x_m)$ formed in sub-step S13, the relationship coefficient $a_f$ is obtained.

sub-step S22: in the underwater photon data set WP, with the point $(WD_l, WH_l)$ as a center, the semi-major axis $a_l$ and the semi-minor axis $b_l$ and a minimum point number threshold $\text{minpts}_l$ of the elliptical search region being respectively related to a major axis, a minor axis, the minimum point number threshold initial value, and the relationship coefficient:

$$\begin{cases} a_l = b_l \times \text{Ratio\_ab} \\ b_l = b \times (1 + a_f \times \text{abs}(WH_l - H'_{min})) \\ \text{minpts}_l = \text{minpts} \times (1 - a_f \times \text{abs}(WH_l - H^1_{min})) \end{cases},$$

$l \in [1, N_{wp}]$, rotating the search ellipse counterclockwise at intervals of $\Delta \theta$ to form $k_\theta$ elliptical search regions with different directions:

$$k_\theta = 2\pi / \Delta \theta.$$

Preferably, in the step S3, the step of acquiring bathymetry results includes:

sub-step S31: traversing each point in the underwater photon data set WP, and determining whether the remaining points $(WD_x, WH_x)$ in the underwater photon data set WP are located in the w elliptical search region with the point $(WD_l, WH_l)$ as a center and $a_l$, $b_l$ as the semi-major axis and the semi-minor axis;

$$\text{disw}_w = \frac{x_w^2}{a_l} + \frac{y_w^2}{b_l}, w = 1, 2, 3, \ldots k_\theta.,$$

wherein:

$x_w = (WD_x - WD_k) \times \sin(w \times \Delta \theta) + (WH_x - WH_k) \times \cos(w \times \Delta \theta)$ $y_w = (WD_x - WD_k) \times \sin(w \times \Delta \theta) - (WH_x - WH_k) \times \cos(w \times \Delta \theta)$, if $\text{disw}_x < 1$, indicating that the point $(WD_x, WH_x)$ is in the rotated elliptical search region with $(WD_l, WH_l)$ as a center. The number of all signal points in the rotated elliptical search region is counting as $\text{minpts}_w$; selecting an ellipse including the largest number $\text{minpts}_w$ of photon points as a filter ellipse for the point in all rotated ellipses;

$\text{minpts}_{wf} = \max(\text{minpts}_w), w=1,2,3, \ldots k_\theta$.

if $\text{minpts}_w$ is larger than the minimum number $\text{minpts}_l$ of the points, then marking $(WD_l, WH_l)$ as the signal point, otherwise being a noise point.

Preferably, in the step S11, the raw point cloud data P of photon counting Lidar is a two-dimensional point set.

Preferably, in the step S13, with the center elevation $h_i$ of each elevation slices as the horizontal axis and the number $x_j$ of photon signals in the slices as the vertical axis, the relationship between them are constructed.

The present invention has the following beneficial effects: the present invention proposes an adaptive threshold filtering algorithm for photon counting Lidar, which may effectively select the filter threshold adaptively for the situation of large photon signal noise and uneven distribution of water surface and underwater photon signals. The method could automatically and efficiently extract the water surface and underwater photon signals and acquiring continuous water depth data. The method may process the data in different water environments during daytime and nighttime acquired by aerospace and aviation photon counting Lidar.

BRIEF DESCRIPTION OF THE DRAWINGS

Aspects of the present invention are best understood from the following detailed description when read with the accompanying figures. The exemplary embodiments of the present invention and the description thereof are used to explain the present invention, and do not constitute improper limitations on the preset invention. In the drawings.

DESCRIPTION OF THE PREFERRED EMBODIMENTS

Figure 1:
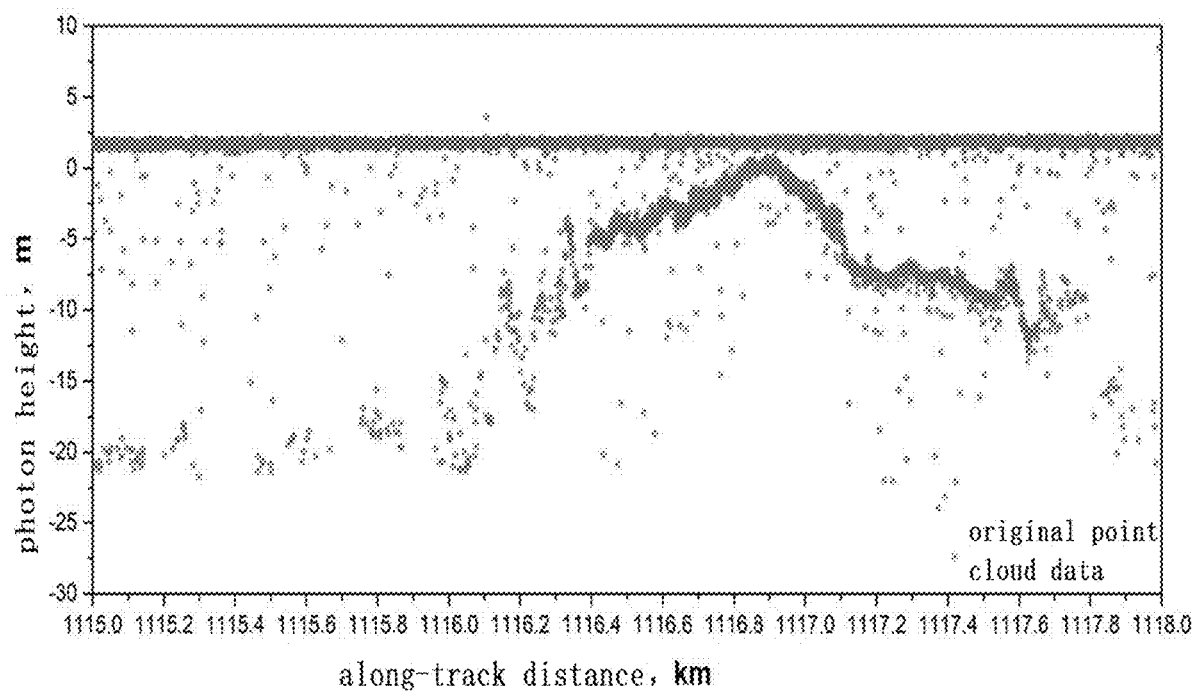
FIG. 1 is a raw data distribution diagram of a photon counting Lidar for an adaptive filtering method of photon counting Lidar for bathymetry according to an embodiment of the present invention.
Figure 2:
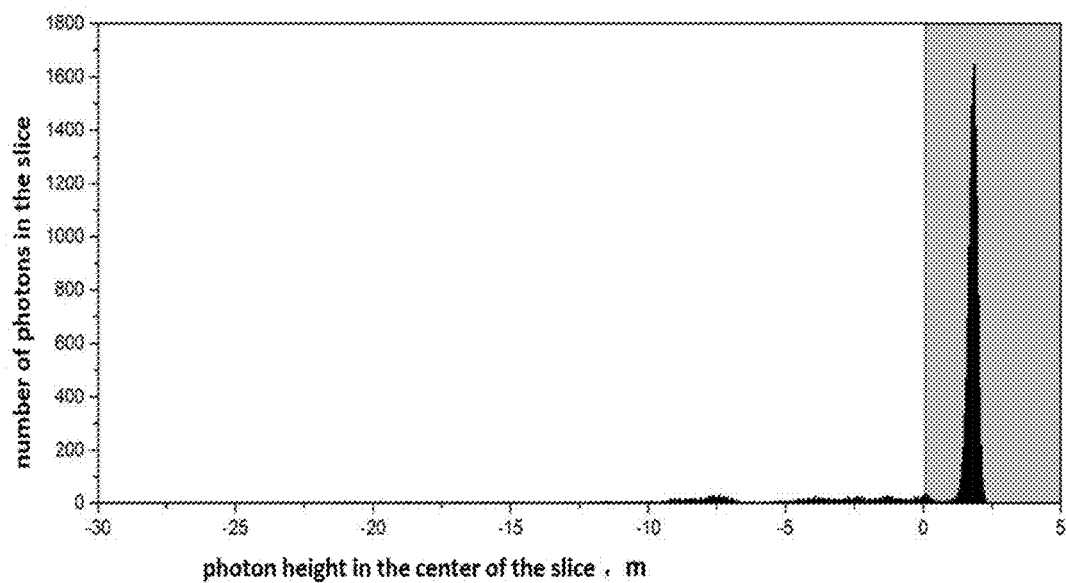
FIG. 2 is a histogram of photon number statistical distribution after the photon is sliced in the elevation direction for the adaptive filtering method of photon counting Lidar for bathymetry according to an embodiment of the present invention.
Figure 3:
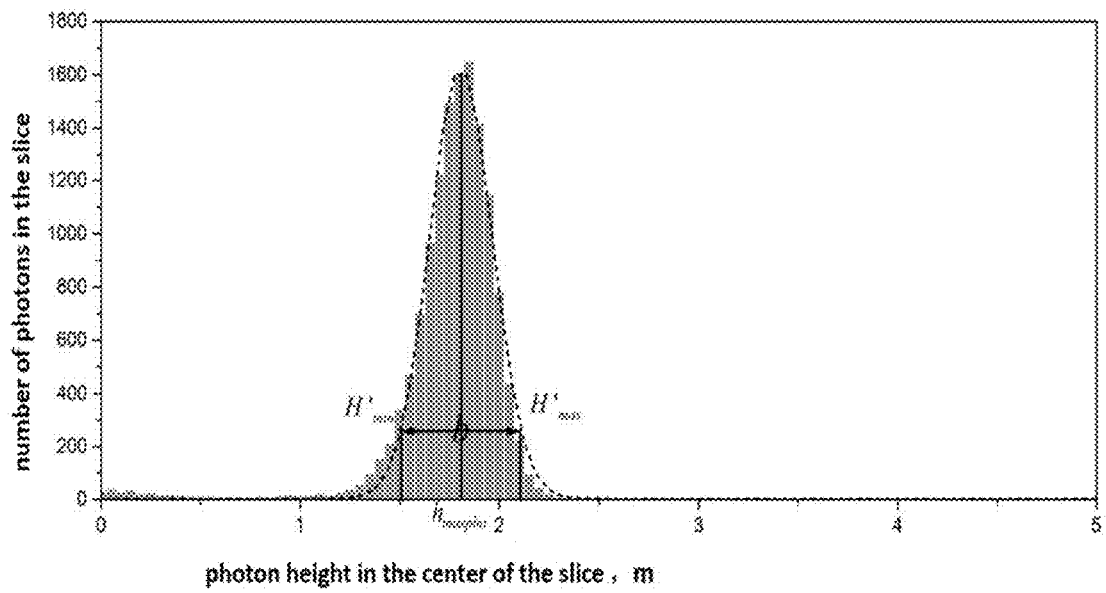
FIG. 3 is a length distribution chart of a minor axis of a determined initial elliptical search region for the adaptive filtering method of photon counting Lidar for bathymetry according to an embodiment of the present invention.
Figure 4:
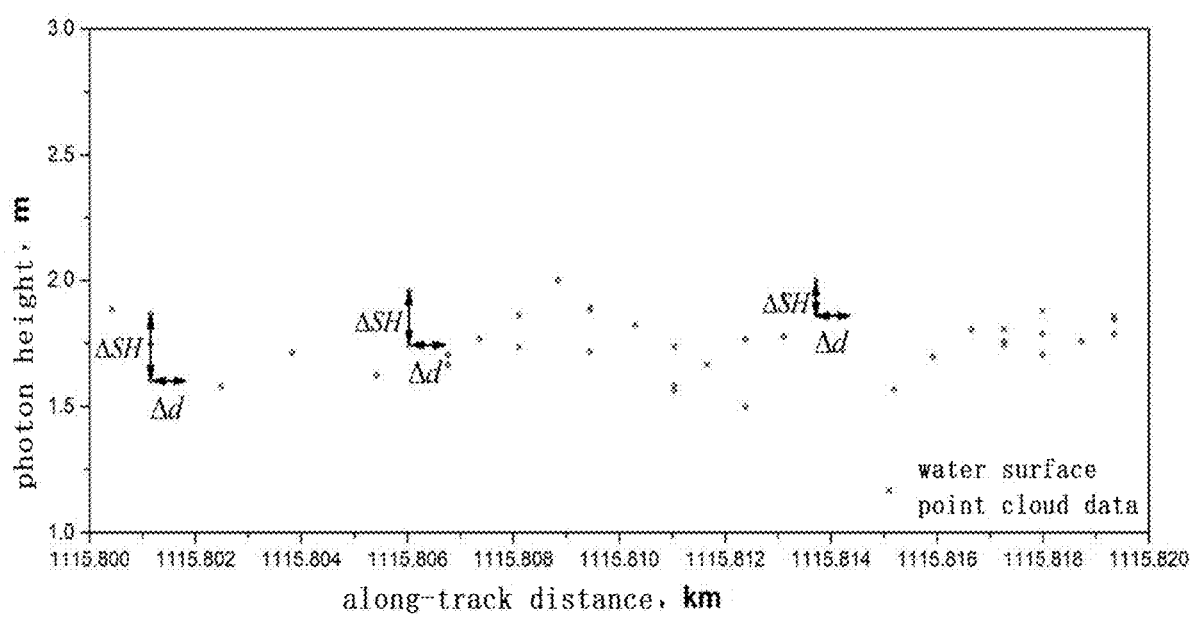
FIG. 4 is a ratio distribution chart of a length of major axis to a length of minor axis of a determined initial elliptical search region for the adaptive filtering method of photon counting Lidar for bathymetry according to an embodiment of the present invention.
Figure 5:
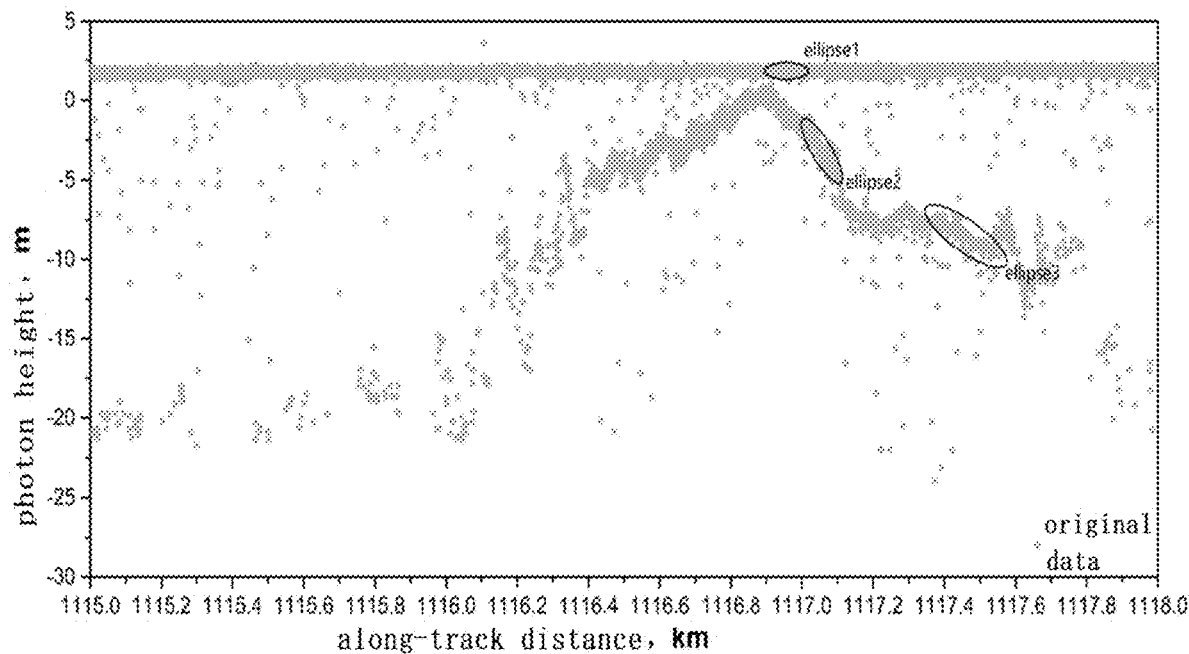
FIG. 5 is a view showing a search ellipse that varies with photon height for the adaptive filtering method of photon counting Lidar for bathymetry according to an embodiment of the present invention.
Figure 6:
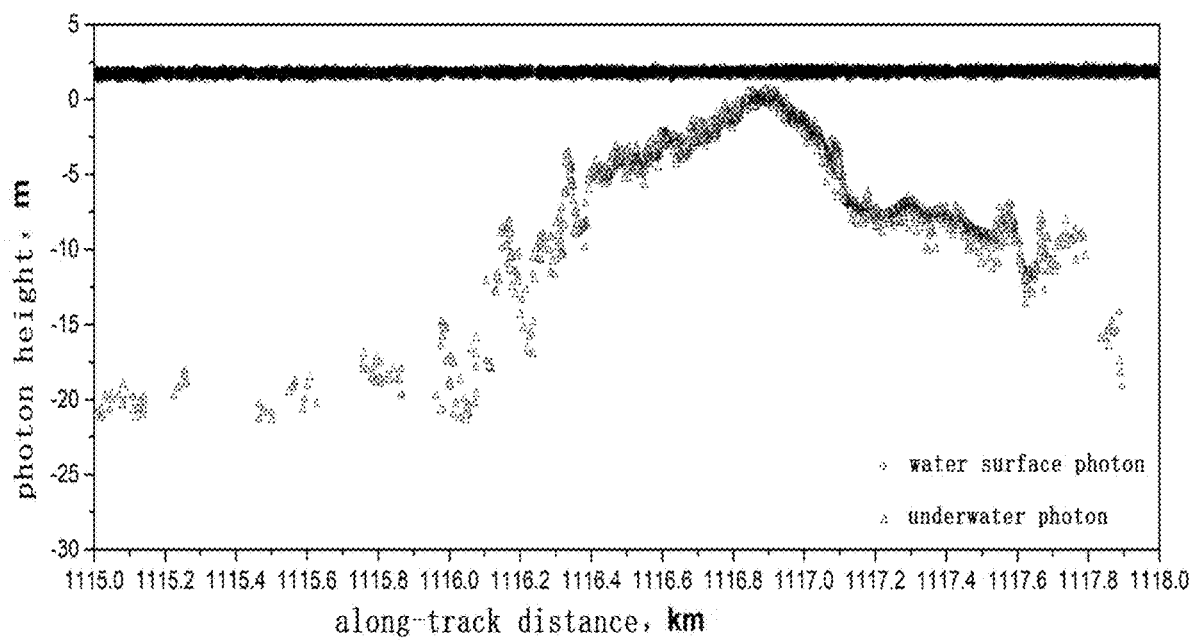
FIG. 6 is a filtering result distribution diagram for the adaptive filtering method of photon counting Lidar for bathymetry according to an embodiment of the present invention.

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. The technical solutions in the embodiments of the present invention will be clearly and completely described below in conjunction with the accompanying drawings in the embodiments of the present invention. Obviously, the described embodiments are only a part of the embodiments of the present invention, rather than all the embodiments.

According to an embodiment of the present invention, an adaptive filtering method of photon counting Lidar for bathymetry includes the following steps:

step S1: adaptively acquiring the filter parameters of the elliptic filtering for water surface photon signals;

step S2: determining the relationship between the filter parameters and the elevation of the underwater photon signals, and obtaining the parameters of the elliptic filtering for photon signal in water column; and step S3: filtering and fitting the water surface photon signals and the underwater photon signals to acquire continuous bathymetry results.

Preferably, the adaptive filtering method of photon counting Lidar for bathymetry includes the following steps:

1) Raw point cloud data of the photon counting Lidar is a two dimensional point set:

$$P=(D_P,H_i), i\in[1,N_p] \quad (1);$$

wherein $D_i$ is the along-track distance of each photon signal, $H_i$ is the elevation of each photon signal, and N P is the number of photon included in the raw point cloud data.

2) With $\Delta h$ as a slice interval of the elevation direction, original data are cut into m slices in the elevation direction:

$$m = \frac{\max(H_i) - \min(H_i)}{\Delta h}. \quad (2)$$

3) For m slices sliced, the number $x_m$ of photon signals in each slice is counted. With the center elevation $h_m$ of each elevation slice as the horizontal axis and the number $x_m$ of photon signals in the slices as the vertical axis, a relationship between them is constructed.

$$h_m = \min(H_i) + \frac{2m-1}{2}\Delta h. \quad (3)$$

4) A relationship between the center elevation of the elevation slice $h_m$ and the number of photon signals in the slices $x_m$ with a normal distribution curve in the 3rd step is fitted to obtain a fitting relationship as below:

$$f(x) = x_{maxpho}\exp\left(-\frac{(x-h_{maxpho})^2}{2\sigma^2}\right); \quad (4)$$

wherein $x_{maxpho}$ indicates the number of photons in the elevation slice containing the most photon signals, and $h_{maxpho}$ indicates the elevation of this slice, σ is the standard deviation of the normal distribution, and $x_{maxpho}$ indicates a normally-distributed independent variable.

5) With $h_{maxpho}$ as a center and twice the normal distribution standard deviation as a left and right threshold, an elevation boundary line of the water surface photons is determined. An elevation lower limit $H'_{min}$ and an elevation upper limit $H'_{max}$ of the water surface photon is obtained while determining a semi-minor axis b of the search ellipse for filtering.

$$\begin{cases} H'_{min} = h_{maxpho} - 2\sigma \\ H'_{max} = h_{maxpho} + 2\sigma \end{cases}, \quad (5)$$

$$b = 2\sigma. \quad (6)$$

6) With the elevation lower limit value and the elevation upper limit value of the water surface photons as boundaries, the elevation of each water surface photon is acquired to form a water surface photon data set SP and an underwater photon data set WP.

$$\begin{cases} SP = (SD_k, SH_k), k \in [1, N_{sp}] \\ WP = (WD_l, WH_l), l \in [1, N_{wp}] \end{cases} \quad (7)$$

wherein $SD_k$ indicates the along-track distance of a water surface photon in the data set, $SH_k$ indicates the elevation of the photon on water surface, and $N_{sp}$ is the number of photons in the water surface data set that meet the following conditions: $H'_{min} < SH_k < H'_{max}$, $WD_l$ indicates an along-track distance of a underwater photon in the data set, $WH_l$ indicates the elevation of the underwater photon, and $N_{wp}$ is the number of photons in the underwater data set that meet the following conditions: $WH_l < H'_{min}$.

7) In the water surface photon data set SP, with a length of the along-track resolution $\Delta d$ of the photon counting Lidar as the boundary, the water surface photons are placed into q sets $WP_u$.

$$q = \frac{\max(SD_k) - \min(SD_k)}{\Delta d}; \quad (8)$$

$$WP_u = (SD_u, SH_u), u \in [1, q]. \quad (9)$$

8) A maximum difference of elevation for photons in the q sets is counted in the elevation direction $\Delta SH_u$.

$$\Delta SH_u = \max(SH_u) - \min(SH_u) \quad (10).$$

A ratio between the along-track resolutions $\Delta d$ and $\Delta SH_u$, and a mean Ratio_ab is acquired, which is the ratio of the major axis to the minor axis of the search ellipse, thereby acquiring a semi-major axis a.

$$\text{Ratio\_ab} = \frac{\sum_{u=1}^{q} \Delta d / \Delta SH_u}{q}; \quad (10)$$

$$a = b \times \text{Ratio\_ab}. \quad (11)$$

9) In the water surface photon data set SP, all data points are traversed, and then a search region is constructed with the point as a center, and a, b as the major axis and the minor axis of the ellipse respectively, to count the number of the points $p_v$, $v=1, 2, 3 \ldots N_{sp}$ in the search region. The mean value of the number of the points is the initial minimum number of the points minpts $$minpts = \frac{\sum_{v=1}^{N_{sp}} p_v}{N_{sp}}. \quad (13)$$

10) Each point is traversed in the water surface photon data set SP, and with the point $(SD_k, SH_k)$ as a center and a, b as the semi-major axis and the semi-minor axis of the elliptical search region respectively, whether the remaining points $(SD_x, SH_x)$ in the water surface photon data set SP are located in the search region is determined:

$$diss_x = \frac{(SD_x - SD_k)^2}{a} + \frac{(SH_x - SH_k)^2}{b}; \quad (14)$$

if $diss_x < 1$, the point $(SD_x, SH_x)$ is located in the elliptical search area with $(SD_k, SH_k)$ s a center. Then the number of all he signal points in the search region is counted; if this value is larger than minpts, then $(SD_k, SH_k)$ is marked as the signal point, otherwise being a noise point.

11) How the underwater photons change with a water depth is determined after filtering the water surface photons based on the data set $(h_m, x_m)$ formed in the third step, the relationship coefficient $a_f$ is obtained.

12) In the underwater photon data set WP, with the point $(WD_l, WH_l)$ as a center, the semi-major axis $a_l$ and the semi-minor axis $b_l$ and a minimum point number threshold $minpts_l$ of the elliptical search region are respectively related to a major axis, a minor axis, the minimum point number threshold initial value, and the change coefficient.

$$\begin{cases} a_l = b_l \times \text{Ratio\_ab} \\ b_l = b \times (1 + a_f \times \text{abs}(WH_l - H'_{min})) \\ minpts_l = minpts \times (1 - a_f \times \text{abs}(WH_l - H'_{min})) \end{cases}, l \in [1, N_{wp}]. \quad (15)$$

13) The search ellipse is rotated counterclockwise at intervals of $\Delta\theta$ to form $k_\theta$ elliptical search regions with different directions:

$$k_\theta = 2\pi/\Delta\theta \quad (16).$$

14) Each point is traversed in the underwater photon data set WP, and determining whether the remaining points $(WD_x, WH_x)$ in the underwater photon data set WP are located in the w elliptical search region with the point $(WD_l, WH_l)$ as a center and $a_l$, $b_l$ as the semi-major axis and the semi-minor axis $$disw_w = \frac{x_w^2}{a_l} + \frac{y_w^2}{b_l}, \quad w = 1, 2, 3, \ldots k_\theta. \quad (17);$$

wherein:

$x_w = (WD_x - WD_k) \times \sin(w \times \Delta\theta) + (WH_x - WH_k) \times \cos(w \times \Delta\theta)$ $y_w = (WD_x - WD_k) \times \sin(w \times \Delta\theta) - (WH_x - WH_k) \times \cos(w \times \Delta\theta) \quad (18),$ 15) If $disw_x < 1$, indicating that the point $(WD_x, WH_x)$ is in the rotated elliptical search region with $(WD_l, WH_l)$ as a center. The number $minpts_w$ of all signal points is counted in the rotated elliptical search region is counting as $minpts_w$. An ellipse including the largest number of photon points is selected as a filter ellipse for the point in all rotated ellipses.

$minpts_{wl} = \max(minpts_w), w=1,2,3, \ldots k_\theta. \quad (19).$

If $minpts_{wl}$ is larger than the minimum number $minpts_l$ of the points, then marking $(WD_l, WH_l)$ as the signal point, otherwise being a noise point.

In order to facilitate the understanding of the above-mentioned technical solutions of the present invention, the above-mentioned technical solutions of the present invention will be described in detail below through specific usage.

During actual use, the adaptive filtering method of photon counting Lidar for bathymetry according to the present invention includes: adaptive acquisition of parameters of the elliptic filtering for water surface photon signals, determination of the relationship between filter parameters of underwater photon signals and the elevation of underwater photon signals, and obtaining the parameters of the elliptic filtering for photon signal in water column, and filtering and fitting of water surface and water bottom signals. First, the parameters of the elliptic filtering for water surface photon signals are adaptively acquired, original photon signals are sliced in the elevation direction so that the boundary between the water surface and the underwater signal point is determined by analyzing the statistical characteristics of the photons in each slice region, and the major axis, minor axis of the initial ellipse search region and the initial minimum point threshold of the density filter are adaptively acquired; then, a relationship between filter parameters of underwater photon signals and the elevation of underwater photon signals is determined, and a relationship between the major and minor axes of the search ellipse and the minimum point threshold of the density filter and the water depth is determined by analyzing the change characteristics of the number of photons in the elevation slice with the change of the signal photon elevation value. Finally, the water surface photon signals and the underwater photon signals are filtered and extracted to obtain continuous bathymetry results, the water surface signals and the water bottom signals are separated according to the boundary line between the water surface and the underwater signal points determined in the first step on the basis of ellipse filtering, and the water surface signals and the water bottom signals are respectively fitted based on the fitting method, so as to form continuous bathymetry results. The method may process the data obtained by aerospace and aviation photon counting Lidar in different water environments during the day and night, and may effectively select the filter threshold adaptively for the situation of large photon signal noise and uneven distribution of water surface and underwater photon signals. The method could automatically and efficiently extract the water surface and underwater effective photon signals and acquiring continuous water depth data.

In summary, based on the theory of photon counting Lidar detection technology and the data characteristics of photon signals in water bodies, in order to overcome the problems of photon counting data processing, the present invention proposes an adaptive threshold filtering method for photon counting Lidar, which may effectively select the filter threshold adaptively for the situation of large photon signal noise and uneven distribution of water surface and underwater photon signals. The method could automatically and efficiently extract the water surface and underwater photon signals and acquiring continuous water depth data. The method of the present invention may process the data in different water environments during daytime and nighttime acquired by aerospace and aviation photon counting Lidar.

Obviously, those skilled in the art can make various changes and modifications to the present invention without departing from the spirit and scope of the present invention. In this way, if these changes and modifications of the present invention fall within the scope of the present invention and their equivalent technologies, the present invention is also intended to include these changes and modifications.

The invention claimed is:

1. An adaptive filtering method of photon counting Lidar for bathymetry, applied to laser detection technology, comprising steps of:
   step S1: adaptively acquiring parameters of elliptic filtering for water surface photon signals;
   wherein in the step S1, the step of adaptively acquiring parameters of elliptic filtering for water surface photon signals comprises:
   sub-step S11: acquiring raw point cloud data P of the photon counting Lidar:

$$P = (D_i, H_i), i \in [1, N_p],$$

wherein $D_i$ is an along-track distance of each photon signal, $H_i$ is an elevation of each photon signal, and $N_p$ is a number of photon included in the raw point cloud data;
   sub-step S12: with $\Delta h$ as a slice interval of an elevation direction, cutting original data into m slices in the elevation direction:

$$m = \frac{\max(H_i) - \min(H_i)}{\Delta h};$$

sub-step S13: for m slices sliced in the sub-step S12, counting the number $x_m$ of photon signals in each slice:

$$h_m = \min(H_i) + \frac{2m-1}{2}\Delta h,$$

wherein $h_m$ is a center elevation of each elevation slice, and $x_m$ is a number of photon signals in the slices;
   sub-step S14: fitting a relationship between the center elevation of the elevation slice $h_m$ and the number of photon signals in the slices $x_m$ with a normal distribution curve to obtain a fitting relationship f(x):

$$f(x) = x_{maxpho} \exp\left(-\frac{(x - h_{maxpho})^2}{2\sigma^2}\right),$$

wherein $x_{maxpho}$ indicates a number of photon signals in the elevation slice containing the most photon signals, $h_{maxpho}$ indicates the elevation of this slice, $\sigma$ is a standard deviation of a normal distribution, and x indicates a normally-distributed independent variable;
   sub-step S15: with $h_{maxpho}$ in the step S4 as a center and twice the normal distribution standard deviation as a left and right threshold, determining an elevation boundary line of the water surface photons while determining to search a semi-minor axis b of the ellipse for filtering:

$$\begin{cases} H'_{min} = h_{maxpho} - 2\sigma \\ H'_{max} = h_{maxpho} + 2\sigma \end{cases},$$

$$b = 2\sigma,$$

wherein $H'_{min}$ is an elevation lower limit of the water surface photons, and $H'_{max}$ is an elevation upper limit of the water surface photons;
   sub-step S16: with the elevation lower limit $H'_{min}$ and the elevation upper limit $H'_{max}$ of the water surface photons as boundaries, acquiring the elevation of each water surface photon to form a water surface photon data set SP and an underwater photon data set WP:

$$\begin{cases} SP = (SD_k, SH_k), k \in [1, N_{sp}] \\ WP = (WD_l, WH_l), l \in [1, N_{wp}] \end{cases},$$

wherein $SD_k$ indicates the along-track distance of a water surface photon in the data set, $SH_k$ indicates the elevation of the photon on water surface, and $N_{sp}$ is a number of photons in the water surface data set that meet the following conditions:

$$H'_{min} \leqslant SH_k \leqslant H'_{max};$$

$WD_l$ indicates an along-track distance of a underwater photon in the data set, $WH_l$ indicates an elevation of the underwater photon, and $N_{wp}$ is the number of photons in the underwater data set that meet the following conditions: $WH_l < H'_{min}$;

sub-step S17: in the water surface photon data set SP, with a length of an along-track resolution $\Delta d$ of the photon counting Lidar as the boundary, placing the water surface photons into q data sets $WP_u$:

$$q = \frac{\max(SD_k) - \min(SD_k)}{\Delta d},$$
$$WP_u = (SD_u, SH_u), u \in [1, q];$$

sub-step S18: counting a maximum difference of elevation for photons in the q sets in the elevation direction $\Delta SH_u$, and acquiring a mean Ratio_ab, thereby acquiring a semi-major axis a:

$$\Delta SH_u = \max(SH_u) - \min(SH_u),$$

$$\text{Ratio\_ab} = \frac{\sum_{u=1}^{q} \Delta d / \Delta SH_u}{q},$$

$$a = b * \text{Ratio\_ab},$$

wherein Ratio_ab is a ratio of the major axis to the minor axis of the search ellipse;

sub-step S19: in the water surface photon data set SP, traversing all data points, and then constructing a search region with the point as a center, a as the major axis and b as the minor axis of the ellipse to count the number of the points $p_v$, $v=1, 2, 3 \ldots N_{sp}$ in the search region, and a mean of the number of the points is an initial minimum number of the points minpts:

$$minpts = \frac{\sum_{v=1}^{N_{sp}} p_v}{N_{sp}};$$

sub-step S110: traversing each point in the water surface photon data set SP, and with the point $(SD_k, SH_k)$ as a center and a, b as the semi-major axis and the semi-minor axis of the elliptical search region respectively, determining whether the remaining points $(SD_x, SH_x)$ in the water surface photon data set SP are located in the search region:

$$diss_x = \frac{(SD_x - SD_k)^2}{a} + \frac{(SH_x - SH_k)^2}{b},$$

if $diss_x < 1$, the point $(SD_x, SH_x)$ is in the elliptical search region with $(SD_k, SH_k)$ as a center, and then counting the number of all the signal points in the search region; if this value is larger than minpts, then marking $(SD_k, SH_k)$ as a signal point, otherwise being a noise point;

step S2: determining a relationship between filter parameters and elevation of underwater photon signals, and obtaining parameters of the elliptic filtering for photon signal in water column;

wherein in the step S2, the step of determining a relationship between filter parameters and elevation of underwater photon signals comprises:

sub-step S21: determining how the underwater photons change with a water depth after filtering the water surface photons, basing on the data set $(h_m, x_m)$ formed in sub-step S13, a relationship coefficient $a_f$ is obtained;

sub-step S22: in the underwater photon data set WP, with the point $(WD_l, WH_l)$ as a center, the semi-major axis $a_l$ and the semi-minor axis $b_l$ and a minimum point number threshold $minpts_l$ of the elliptical search region being respectively related to a major axis, a minor axis, the minimum point number threshold initial value, and the relationship coefficient:

$$\begin{cases} a_l = b_l \times \text{Ratio\_ab} \\ b_l = b \times (1 + a_f \times \text{abs}(WH_l - H'_{min})), \\ minpts_l = minpts \times (1 - a_f \times \text{abs}(WH_l - H'_{min})) \end{cases}, l \in [1, N_{wp}],$$

rotating the search ellipse counterclockwise at intervals of $\Delta\theta$ to form $k_\theta$ elliptical search regions with different directions:

$$k_\theta = 2\pi/\Delta\theta; \text{ and}$$

step S3: filtering and fitting the water surface photon signals and the underwater photon signals to acquire continuous bathymetry results;

wherein in the step S3, the step of acquiring bathymetry results comprises:

sub-step S31: traversing each point in the underwater photon data set WP, and determining whether the remaining points $(WD_x, WH_x)$ in the underwater photon data set WP are located in an w elliptical search region with the point $(WD_l, WH_l)$ as a center and $a_l$, $b_l$ as the semi-major axis and the semi-minor axis;

$$disw_w = \frac{x_w^2}{a_l} + \frac{y_w^2}{b_l}, \quad w = 1, 2, 3, \ldots k_\theta,$$

wherein:

$$x_w = (WD_x - WD_k) \times \sin(w \times \Delta\theta) + (WH_x - WH_k) \times \cos(w \times \Delta\theta)$$

$$y_w = (WD_x - WD_k) \times \sin(w \times \Delta\theta) + (WH_x - WH_k) \times \cos(w \times \Delta\theta),$$

if $disw_x < 1$, indicating that the point $(WD_x, WH_x)$ is in a rotated elliptical search region with $(WD_l, WH_l)$ as a center, and the number of all signal points in the rotated elliptical search region is counting as $minpts_w$; selecting an ellipse including the largest number $minpts_w$ of photon points as a filter ellipse for the point in all rotated ellipses;

$$minpts_{wl} = \max(minpts_w), w = 1, 2, 3, \ldots k_\theta,$$

if $minpts_{wl}$ is larger than the minimum number $minpts_l$ of the points, then marking $(WD_l, WH_l)$ as the signal point, otherwise being a noise point;

wherein the adaptive filtering method of photon counting Lidar for bathymetry is applied to automatically and efficiently extract the water surface and underwater photon signals and to acquire continuous water depth data by performing the adaptive filtering in combination with gathering data using the LIDAR.

2. The adaptive filtering method of photon counting Lidar for bathymetry according to claim 1, wherein in the step S11, the raw point cloud data P of photon counting Lidar is a two-dimensional point set.

3. The adaptive filtering method of photon counting Lidar for bathymetry according to claim 1, wherein in the step S13, with the center elevation $h_i$ of each elevation slice as the horizontal axis and the number $x_j$ of photon signals in the slices as the vertical axis, the relationship between them are constructed.

* * * * *